(12) United States Patent
Fardig et al.

(10) Patent No.: US 9,426,144 B1
(45) Date of Patent: Aug. 23, 2016

(54) SINGLE SIGN-ON SERVICE SECURITY PROTECTIONS

(71) Applicant: Lenovo (Singapore) Pte. Ltd., Singapore (SG)

(72) Inventors: Matthew William Fardig, Boonville, IN (US); Riley G. Branch, Eagle Mountain, UT (US); Allen Wayne Richey, Frisco, TX (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/634,127

(22) Filed: Feb. 27, 2015

(51) Int. Cl.
*H04L 29/06* (2006.01)
(52) U.S. Cl.
CPC .................................. *H04L 63/0815* (2013.01)
(58) Field of Classification Search
CPC .................................................. H04L 63/0815

USPC ............................................................ 726/8
See application file for complete search history.

(56) References Cited

U.S. PATENT DOCUMENTS 8,863,246 B2 * 10/2014 Norman ......................... 713/168

FOREIGN PATENT DOCUMENTS

JP 4652350 B2 * 3/2011

* cited by examiner

*Primary Examiner* — Jacob Lipman
(74) *Attorney, Agent, or Firm* — Ference & Associates LLC

(57) ABSTRACT

One embodiment provides a method, including: receiving, from an end user device, authentication data of a user of a web service; storing, in a single sign-on service, the authentication data; receiving, at the single sign-on service, one or more initiations for the web service; generating, using a processor, real-world placeholder data for the user; and employing the real-world placeholder data in an automated sign-on process to the web service. Other embodiments are described and claimed.

20 Claims, 4 Drawing Sheets

SINGLE SIGN-ON SERVICE SECURITY PROTECTIONS

BACKGROUND

Single sign-on (SSO) to web services (e.g., web sites, web applications, etc.) is currently available and is increasingly being adopted. By way of example, in conventional systems, an SSO service proxies web sites that require a sign-on by a user, e.g., a log-in page that secures access to additional, authenticated post log-in pages. When a user authenticates to the SSO service and requests a web site, the SSO service provides the user's log-in credentials/authentication data to the flow, as the SSO service has previously stored the necessary data for doing so. This provides a single sign-on capability, i.e., the user need only authenticate to the SSO service, which handles remaining log-ins for the web services. The user may configure the SSO service, e.g., give it user access credentials for various web services.

BRIEF SUMMARY

In summary, one aspect provides a method, comprising: receiving, from an end user device, authentication data of a user of a web service; storing, in a single sign-on service, the authentication data; receiving, at the single sign-on service, one or more initiations for the web service; generating, using a processor, real-world placeholder data for the user; and employing the real-world placeholder data in an automated sign-on process to the web service.

Another aspect provides an electronic device, comprising: a processor; and a memory that stores instructions executable by the processor to: receive, from an end user device, authentication data of a user of a web service; store, in a single sign-on service, the authentication data; receive, at the single sign-on service, one or more initiations for the web service; generate, using a processor, real-world placeholder data for the user; and employ the real-world placeholder data in an automated sign-on process to the web service.

A further aspect provides a product, comprising: a storage device having code stored therewith, the code being executable by a processor of an electronic device and comprising: code that receives, from an end user device, authentication data of a user of a web service; code that stores, in a single sign-on service, the authentication data; code that receives, at the single sign-on service, one or more initiations for the web service; code that generates, using a processor, real-world placeholder data for the user; and code that employs the real-world placeholder data in an automated sign-on process to the web service.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
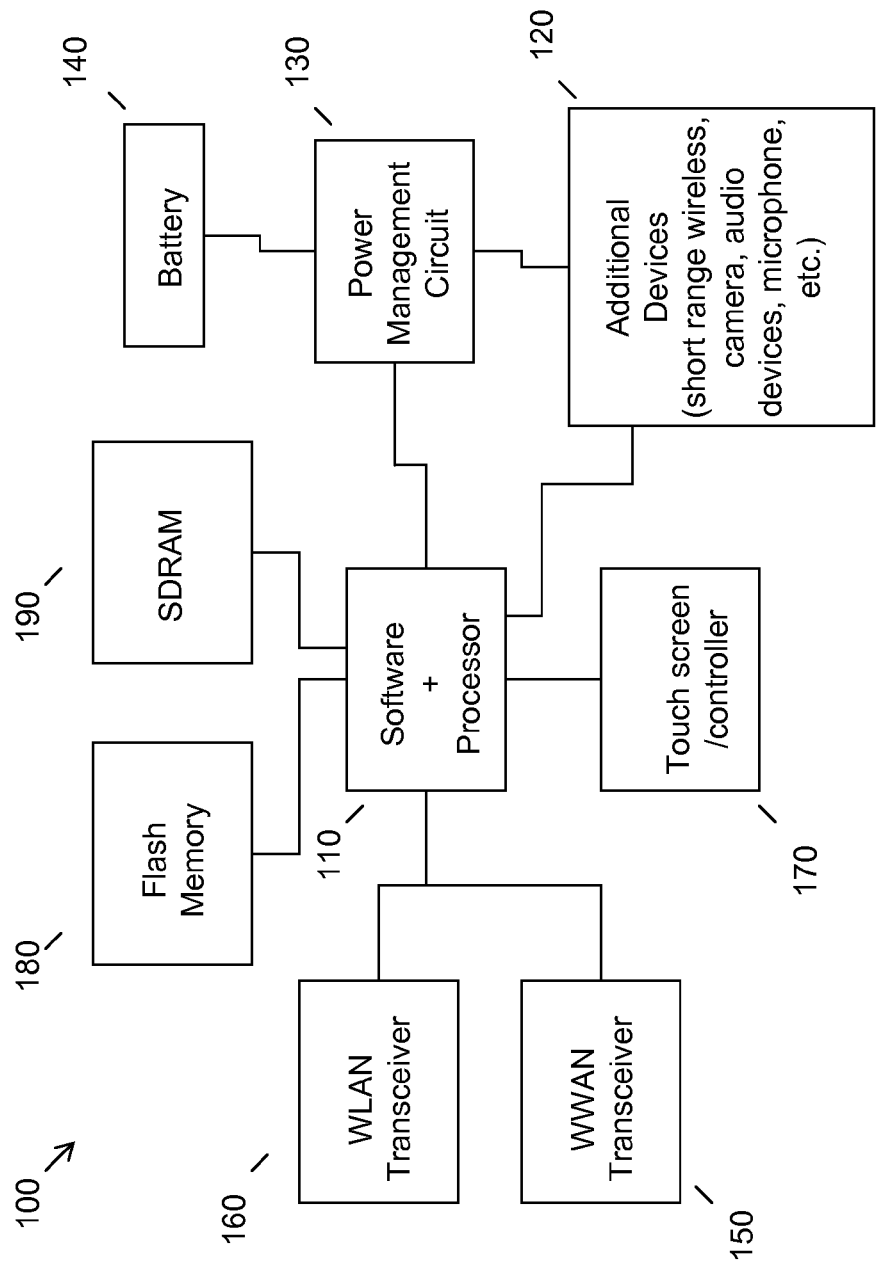
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

One concern with single sign-on (SSO) services is the fact that the user's credentials are retrieved and then injected into a web page in the user's browser. This process doesn't provide any extra security in terms of visibility of the credentials as compared to the situation in which the user actually types in the credentials manually. For example, if someone were running a trace tool in the user's browser or device, the injected credentials may be compromised, as they are sent in the request (e.g., via a POST/GET, an AJAX call, etc.).

SSO services introduced the concept of placeholders for SSO to proxied web applications. Rather than injecting the user's actual credentials, these services inject values such as "@@placeholder:userid@@" and "@@placeholder:password@@." When the authentication is performed, that request runs back through the proxy server. At that time, the proxy server substitutes the user's real credentials in place of the placeholders before sending the request to the backend application. However, use of standardized placeholders may signify that placeholders are being used rather than real credentials.

Accordingly, an embodiment combines the user of placeholders generally with the use of real-world looking data such that the placeholders take on the appearance of actual credentials. This permits use of improved, real-world placeholders, rather than use of a stock placeholder that clearly indicates to anyone watching that placeholders are in use.

Through use of false, but real-world looking data, an embodiment effectively creates a placeholder authentication system that is undetectable to an attacker. For example, instead of using an obvious placeholder such as "@@placeholder:userid@@," a value such as "jdoe@[email domain of choice].com" is sent, where the email domain of choice may be selected from a variety of available providers. This value may be auto generated by the server and it does not have to be a real value, i.e., does not have to be an actual email address or like credential, although it has the appearance of a real value. The value may be generated only for that request and may be valid only for that single authentication attempt.

When the proxy server sees the authentication request come through, it replaces "jdoe@[email domain of choice].com" with the user's real SSO authentication data. The same or similar type of substitution may occur for all such SSO data, e.g., the user's password. An embodiment thus makes the use of placeholder authentication transparent to both the end user and a potential attacker. While a user's credentials never appear in the browser, it is not obvious to that attacker that placeholders are in use.

Moreover, by use of a combination of real-world looking data with placeholders, a list of real world data used in placeholders may be kept in a log file. For example, a log may be kept and show that on August 27th, at 2:45 PM, User A did authentication to Application B, with placeholder data "jdoe@[email domain of choice].com." Later, should someone attempt manual authentication to Application B with that same faux credential data, it is a clear flag to an administrator that User A's data was compromised. This information may be used to properly protect User A, as well as to possibly help locate the attacker. The attacker that was successful in compromising the data never had access to real credentials.

An embodiment may extend the use of real-world data used in placeholders to allow for a more intelligent selection of imitation credentials, e.g., that appear to apply to the current user. For example, a challenge is that the imitation data, although real-world in format, may nonetheless remain quite obvious. By way of non-limiting example, if the user is "John," but the SSO is performed with an imitation user ID of "Mary," even if in a real-world format that mimics an email address, it may clearly announce to a sophisticated attacker that placeholders are in use. While this is still very secure, it may tend to reduce the effectiveness of this type of credential protection.

Accordingly, an embodiment uses a combination of the placeholder protection with imitation, real-world data and the ability to select a meaningful set of imitation credentials that appear to be valid for the current user. For example, if "John" is sitting at his keyboard, and an attacker sees "Mary" appear in the user ID field, this may act as an announcement that placeholders are in use. An embodiment therefore adds intelligent credential selection to the concept of SSO real-world placeholders.

This type of real-world placeholder data selection may include a selection based on a user characteristic, e.g., a demographic characteristic. For example, an embodiment may select a real-world name based on the user's demographic characteristic, whether inferred or provided by the user. There are numerous detection algorithms and programming APIs available that may be used for this characteristic based selection. Different or more than one demographic characteristic may be used. For example, an embodiment may base the data selection based on geography. Therefore, if a user is located in North America, it might make sense to select a name common to that country, rather than a name common in Europe. By selecting a closer match between the actual user and the real-world placeholder data used, an embodiment makes the use of real-world placeholders for SSO credential protection virtually indistinguishable from the use of actual credentials.

Once SSO authentication is complete, the SSO system acts as a master authentication. That is, once SSO authentication is complete for the SSO service, the system presents a list of links to applications that are setup to use SSO. The authenticated user simply clicks the link and the application is launched, and sign-in to that application is automatically performed by the service. In other words, once authenticated to the main SSO system, a click is all that is required to access the application as an authenticated user.

SSO systems offer locking features, e.g., should the user need to walk away, however that mechanism relies on the user remembering to use such security features. Therefore, it is not guaranteed to protect the user's SSO applications post-SSO authentication.

An embodiment therefore uses additional input(s), e.g., gestures (such as mouse-based gestures or touch based gestures or even voice or other supplemental data) and SSO authentication to improve the security of the SSO authentication, even post sign-on. For example, in a traditional SSO system, after SSO authentication, a click (or touching of) an application icon is all that is required to launch the application and sign in. In contrast, an embodiment may use the click (or touching of) an application icon to launch the application and without performing SSO functionality, i.e., the user would be required to sign-on manually. However, if the user performs a predefined gesture, e.g., on the application launch link, that would trigger an embodiment to perform the SSO functionality for automated sign-on.

In this way, if a user authenticates to the master SSO system and then leaves their device unattended, anyone compromising the system is unable to access the applications with the original user's credentials. Unauthorized users may still gain access to the public portions of the applications (which do not require authentication); however, without knowing the proper gesture, such users are unable to launch the application in a way that triggers automatic sign-on.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera, short range wireless devices, a microphone, etc. System 100 often includes a touch screen 170 for data input and display/rendering. System 100 also typically includes various memory devices, for example flash memory 180 and SDRAM 190.

Figure 2:
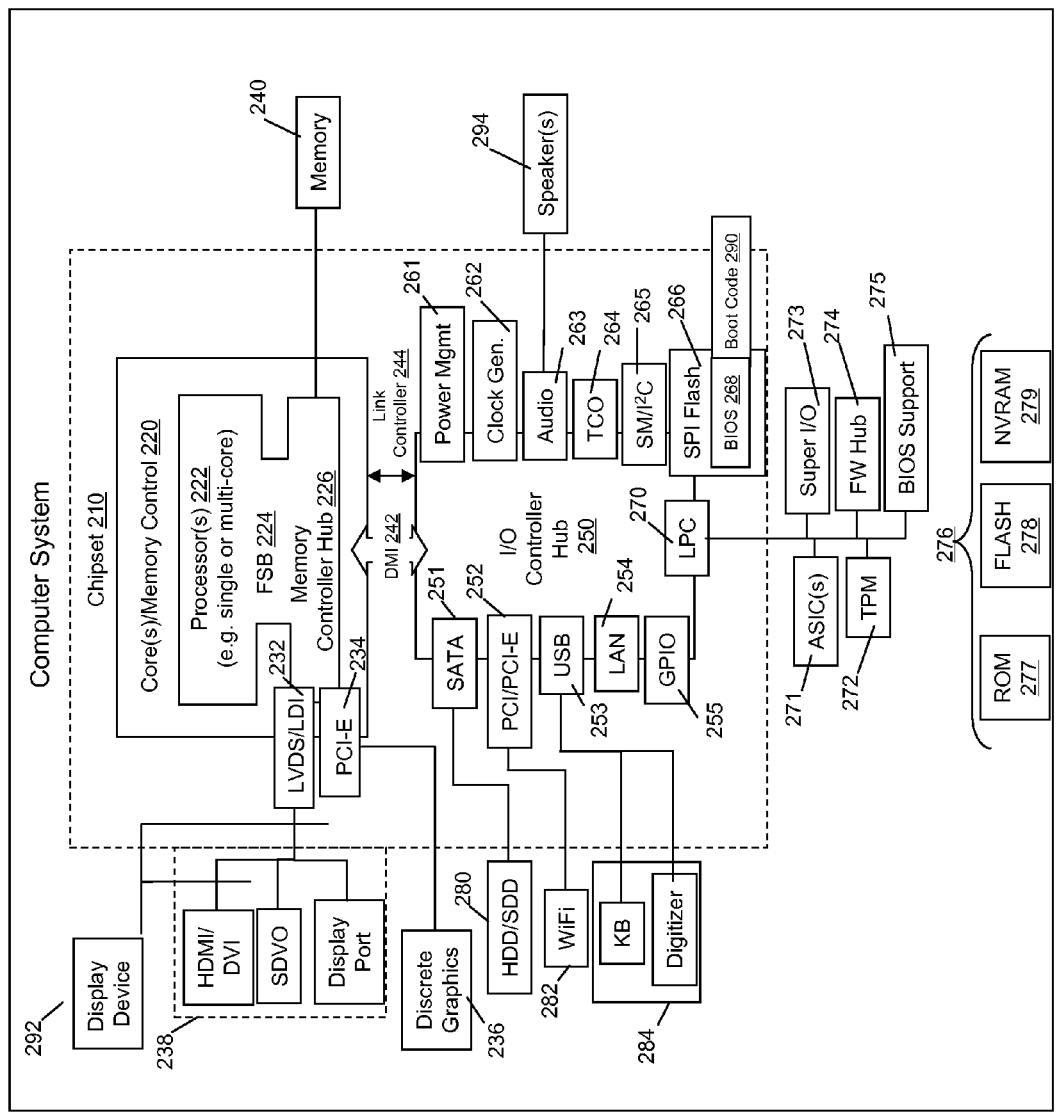
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries.

The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in electronic devices such as tablets, smart phones, personal computer devices generally, and/or other electronic devices. For example, the circuitry outlined in FIG. 1 may be implemented in a tablet or smart phone, whereas the circuitry outlined in FIG. 2 may be implemented in a laptop personal computer. In each case, a client device using circuitry such as outlined in FIG. 1 and/or FIG. 2 may be used to connect to an SSO service by a user. Additionally, circuitry such as outlined in FIG. 1 and/or FIG. 2 may be used to implement an SSO service which accepts user SSO requests and responds thereto, e.g., using real-world placeholder data as described herein.

Figure 3:
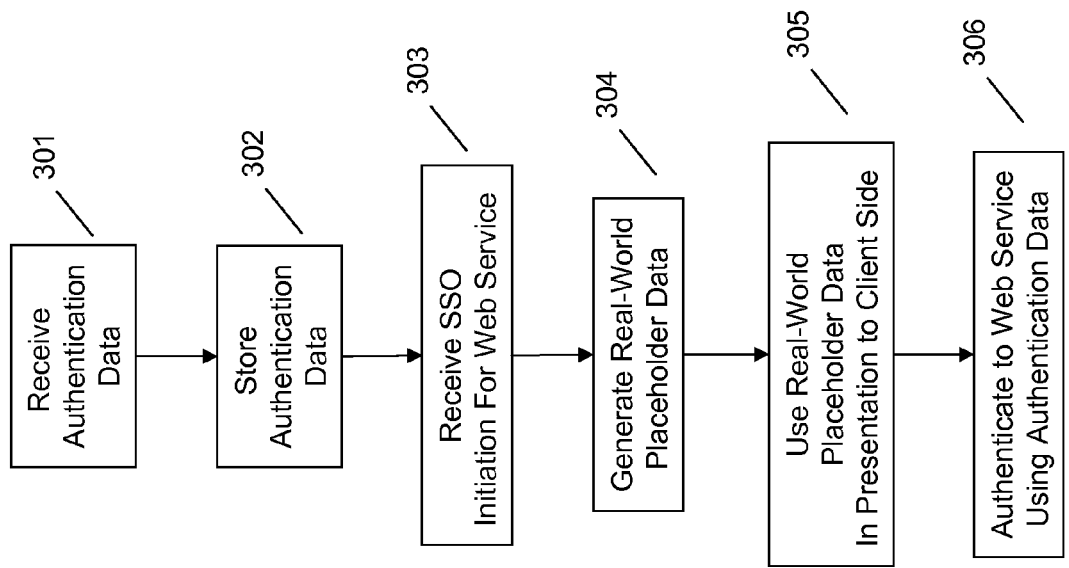
FIG. 3 illustrates an example method of using real-world placeholders in an SSO process.

As illustrated in FIG. 3, an embodiment, e.g., SSO service, receives authentication data of a user of a web service from a client device at 301. Initially, the SSO service stores the authentication data at 302 for future use, e.g., for authenticating the user to a particular web service (e.g., web page login, client device application requiring login, etc.).

Therefore, when the SSO thereafter receives an initiation for a web service from the user at 303, e.g., user click on a link to a web service, the SSO service authenticates the user automatically, allowing the user to access the web service without manual entry of credentials. As described herein, when an initiation is received at 303, an embodiment generates real-world placeholder data for the user at 304, e.g., a faux email address having a look characteristic of an email provider rather than an obviously generic placeholder. An embodiment thus may employ the real-world placeholder data in an automated sign-on process to the web service at 305-306.

Specifically, an embodiment may use the real-world placeholder data in a presentation to the client side device at 305. The view presented at the client device is for example a login page or screen populated with real-world placeholder data rather than a stock or generic placeholder. This both shields the actual authentication data from any potential observer (real or implemented via malicious code) as well as masks the use of the placeholder data generally. As with other uses of placeholder data, an embodiment uses the actual authentication data of the user to authenticate to the web service at 306.

The generating at 304 may include selecting a real-world placeholder format, e.g., a real-world format that conforms to an email address format of an email provider. The generating at 304 may likewise include selection of the placeholder data itself, e.g., a faux user name.

By way of example, the generating at 304 may include employing a characteristic of the user in selecting the real-world placeholder data. The characteristic may be system generated, e.g., using a demographic characteristic such as a location of the user of the client device requesting SSO service, as for example stored in a profile of the user, or the characteristic may be user supplied, e.g., for the specific purpose of generating real-world placeholder data.

In an embodiment, the generating of real-world placeholder data at 304 may be repeated for each initiation of the web service received at 303. For example, repeated generation of placeholder data at 304 may be implemented to produce different real-world placeholder data for each initiation of the web service. This will assist in tracking of use of the real-world placeholder data, as described herein. For example, if a real-world placeholder is used a second time, this may be used to indicate an unauthorized access attempt and/or in tracking of the access attempts using the real-world placeholder data.

Figure 4:
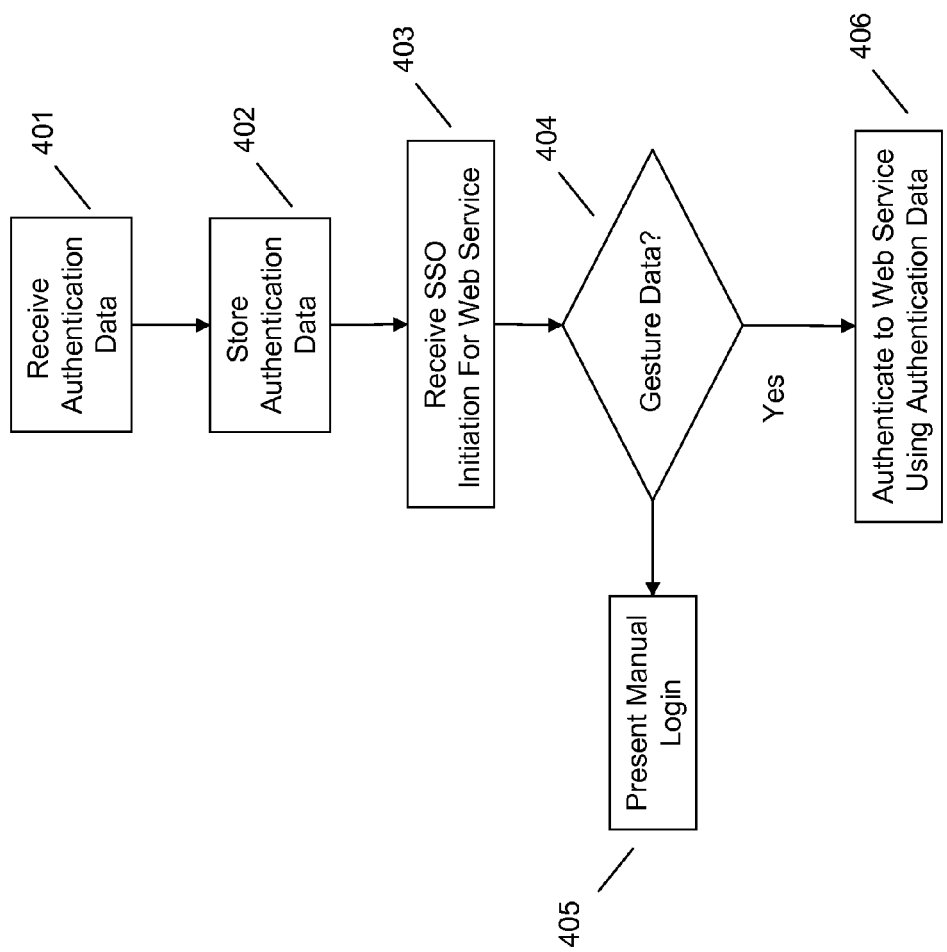
FIG. 4 illustrates an example method of using additional data for accessing a web service via an SSO service.

As described herein, and referring to FIG. 4, an embodiment may increase the security of the SSO service by use of additional data, e.g., gesture data. For example, an embodiment may receive authentication data and store it, 401-402, similar to the process described herein in connection with FIG. 3 at 301-302. However, when a new initiation request is received for a web service, e.g., at 403, an embodiment may determine if the request includes gesture data at 404, i.e., requiring certain gesture data be included in the request in order for the SSO process to proceed. If there is not gesture data included, as determined at 404, an embodiment may present the client with a manual login page or screen at 405.

For example, an embodiment may require certain gesture data at 404, e.g., swipe pattern, contact with a particular detected area of the screen, etc., in order to proceed using the user's authentication data automatically at 406. It should be noted that the gesture data (or other additional data) should be both easy for the user to produce and should be a data input that is not easily guessed or mimicked. This will maximize the ease of use for the user and minimize the potential for unauthenticated use.

Accordingly, the various embodiments may be used to increase the security of an SSO service. In an embodiment, intelligent use of real-world placeholders is utilized to reduce the risk that observers of the process are aware that placeholders are being used at all. Also, an embodiment implements the use of additional data in order to combat unauthorized access to an SSO service (and the coupled web services), particularly post-SSO login. These and other technical problems are solved by the various embodiments.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, from an end user device, authentication data of a user of a web service;
   storing, in a single sign-on service, the authentication data;
   receiving, at the single sign-on service, one or more initiations for the web service;
   generating, using a processor, real-world placeholder data for the user; and
   employing the real-world placeholder data in an automated sign-on process to the web service.

2. The method of claim 1, wherein the generating is repeated for each initiation of the web service.

3. The method of claim 1, wherein the generating is repeated to produce different real-world placeholder data for each initiation of the web service.

4. The method of claim 1, wherein the one or more initiations for the web service comprise gesture data.

5. The method of claim 1, wherein the generating comprises selecting a real-world placeholder format.

6. The method of claim 5, wherein the real-world placeholder format conforms to an email address format of an email provider.

7. The method of claim 1, wherein the generating comprises employing a characteristic of the user in selecting the real-world placeholder data.

8. The method of claim 7, wherein the characteristic is system generated.

9. The method of claim 7, wherein the characteristic is a demographic characteristic.

10. The method of claim 7, wherein the characteristic is user supplied.

11. The method of claim 1, wherein the one or more initiations for the web service comprise gesture data.

12. The method of claim 11, wherein the employing the real-world placeholder data in an automated sign-on process to the web service is conditioned on receipt of the gesture data.

13. An electronic device, comprising:
a processor; and
a memory that stores instructions executable by the processor to:
receive, from an end user device, authentication data of a user of a web service;
store, in a single sign-on service, the authentication data;
receive, at the single sign-on service, one or more initiations for the web service;
generate, using a processor, real-world placeholder data for the user; and
employ the real-world placeholder data in an automated sign-on process to the web service.

14. The electronic device of claim 13, wherein to generate comprises selecting a real-world placeholder format.

15. The electronic device of claim 14, wherein the real-world format conforms to an email address format of an email provider.

16. The electronic device of claim 13, wherein to generate comprises employing a characteristic of the user in selecting the real-world placeholder data.

17. The electronic device of claim 16, wherein the characteristic is system generated.

18. The electronic device of claim 17, wherein the characteristic is a demographic characteristic.

19. The electronic device of claim 16, wherein the characteristic is user supplied.

20. A product, comprising:
a storage device having code stored therewith, the code being executable by a processor of an electronic device and comprising:
code that receives, from an end user device, authentication data of a user of a web service;
code that stores, in a single sign-on service, the authentication data;
code that receives, at the single sign-on service, one or more initiations for the web service;
code that generates, using a processor, real-world placeholder data for the user; and
code that employs the real-world placeholder data in an automated sign-on process to the web service.

* * * * *